United States Patent

[11] 3,542,188

[72] Inventor Clark Mills Kinney, Jr.
Bells Mill Road, Potomac, Maryland 20854
[21] Appl. No. 766,805
[22] Filed Oct. 11, 1968
[45] Patented Nov. 24, 1970

[54] ROD REINFORCED TYPE CONVEYOR BELT
9 Claims, 4 Drawing Figs.
[52] U.S. Cl. .................................................. 198/193,
74/239
[51] Int. Cl. .................................................. B65g 15/30,
F16g 1/18
[50] Field of Search .......................................... 198/193;
74/239; 59/83

[56] References Cited
UNITED STATES PATENTS
1,880,474 10/1932 Pink ............................. 198/193X Primary Examiner—Edward A. Sroka
Attorney—Mason, Fenwick and Lawrence ABSTRACT: A woven wire conveyor belt of the type having a plurality of spiral segments extending transversely thereof and each including plural axially spaced loops, each of the segments being hingedly coupled with the adjacent segments, and a straight cross rod formed from cylindrical stock extending through portions of the loops at each of the hinged connections having inwardly impressed indentations along the surface portions of the cross rods which face toward the upper and lower surfaces of the belt.

Patented Nov. 24, 1970
3,542,188
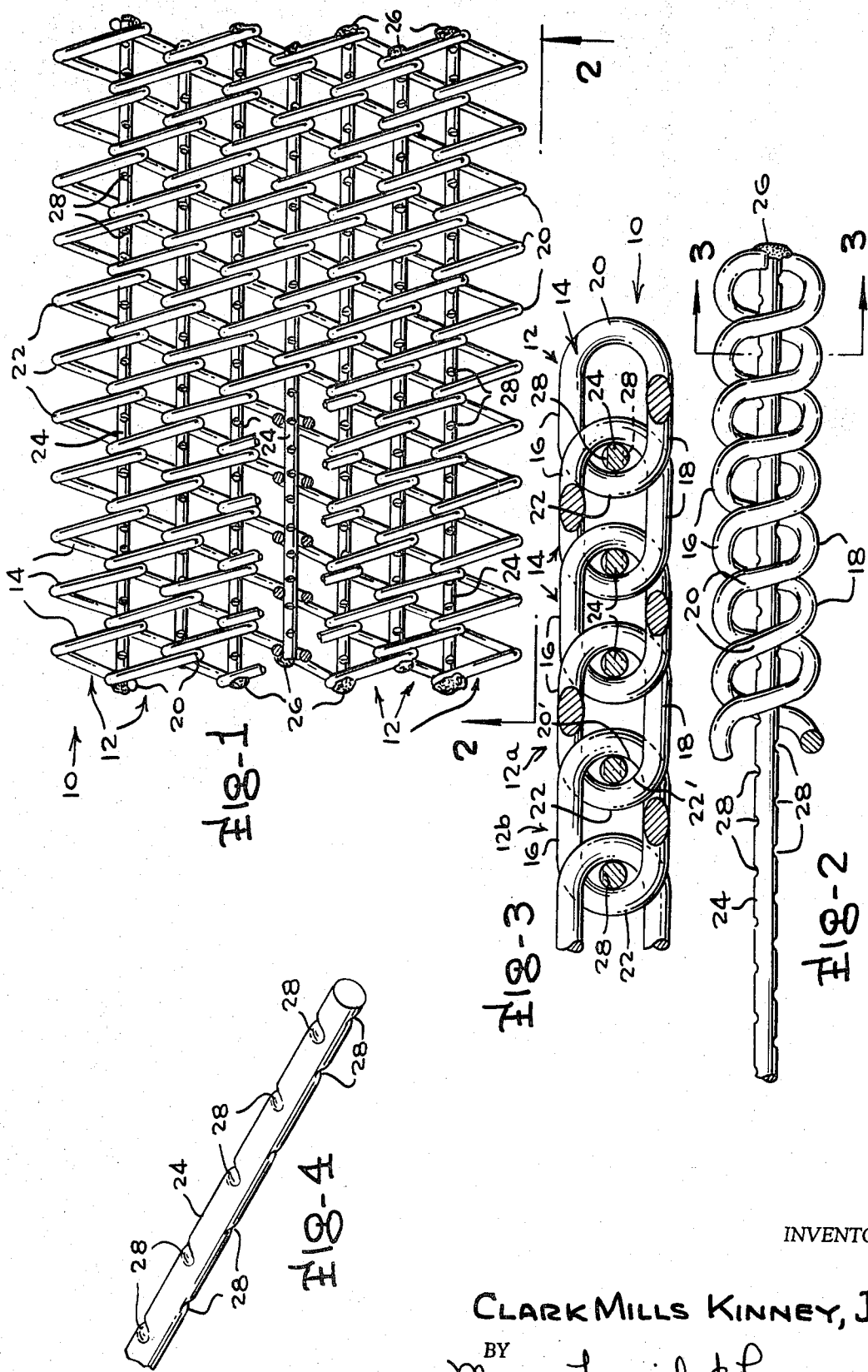
INVENTOR
CLARK MILLS KINNEY, JR.
BY
Mason, Fenwick & Lawrence
ATTORNEYS

ROD REINFORCED TYPE CONVEYOR BELT

BACKGROUND AND OBJECTS OF THE INVENTION

The present invention relates in general to wire conveyor belts, and more particularly to woven wire conveyor belts of the type having intercoupled spiral loop sections and transverse straight rods at the intercoupling zones constructed in a novel manner by crimping wire drawn from a stock reel and orienting the crimped, straightened cross rods in a particular manner.

Woven wire conveyor belts formed of metallic wire woven in various patterns and formed into endless conveyor belts about supporting pulleys have come into wide use, particularly in automated or mechanized processing of articles and materials which are required to be subjected to high temperatures or other processing conditions which would rapidly deteriorate or adversely affect the life or characteristics of the belt material. These woven wire conveyor belts are customarily formed by shaping wire drawn from a stock roll into sections each having a large number of spiral loops, preferably flat spiral loops, and assembling the sections in various patterns or arrangements. In some of the weave designs, the bight portions of the spiral loops are directly interlinked through the bight portions of spiral loops of adjacent sections. In other weave designs, the bight portions of one section are interleaved between, but are not interlinked through, the bight portions of the adjacent section, and these bight portions are linked about either straight or sine wave shaped transverse connecter rods to interconnect the successive sections of spiral loops. In yet another arrangement, generally known as the rod reinforced type woven belt, the bight portions of adjacent sections are interlinked through each other and straight transverse reinforcing rods extend through the interlinking zones of each of the spiral loops interposed between the confronting portions of the interlinking bights, so that the confronting surfaces of the interlinking bights bear against opposite portions of the reinforcing rods rather than directly against each other. These transverse cross rods, serving either as connecting rods or reinforcing rods, are each welded or otherwise connected at their opposite ends to the spiral loops at the opposite lateral ends of the belt to secure them in position. In some instances, the cross rods for rod reinforced type belts have been provided with recesses or notches spaced along the axis of the respective cross rods in positions to face in directions paralleling the plane of the conveying surface of the belt, that is, in the leading and trailing surface portions of the respective rods and facing in leading and trailing directions relative to the movement of the conveying flights of the belt, to receive the bight portions in the notches and tend to hold the loop in selected laterally spaced relation so as to retard lateral migration of the loops out of proper alignment.

A particular problem which arises in connection with such woven wire conveyor belts, particularly those for use in high temperature installations where some softening of the belt material may occur, is the tendency of the center region of the belt, as it travels along the endless conveyor flight, to lag behind the lateral edge portions of the belt, this action being commonly referred to as "V-ing". This distorts or bows the intercoupled sections of spiral loop wire, causing a reduction in belt width and imposing a strain thereon which significantly increases the chances of fracture when they track around the pulleys at the ends of the endless belt. Since the direction of the strain imposed by this V-ing is substantially parallel to the plane of the conveying surface of the belt, the resistance of reinforcing rods of the notched type heretofore mentioned to this type of distortion is significantly diminished, because the notches face in the same direction as the strain and thus weaken the reinforcing rods in this direction.

An object of the present invention is the provision of a novel wire conveyor belt having intercoupled spiral loop sections and straight cross rods at the intercoupling regions between adjacent sections, wherein the straight cross rods are made in a novel manner to provide increased resistance to distortion of transversely spaced portions of the belt out of proper transverse alignment with each other.

Another object of the present invention is the provision of a novel woven wire conveyor belt of the type described in the preceding paragraph, wherein the cross rods are crimped to provide a rectilinear series of crimped recesses on each of a pair of diametrically opposed surface portions thereof facing only toward the upper and lower surfaces of the belt to resist V-ing of the belt.

Another object of the present invention is the provision of a novel woven wire conveyor belt of the type described in the immediately preceding paragraph, wherein the crimped recesses are so located to tend to maintain the loops in preselected alignment and lateral spacing relative to each other.

Other objects, advantages and capabilities of the present invention will become apparent from the following detailed description taken in conjunction with the accompanying drawing illustrating a preferred embodiment of the invention.

BRIEF DESCRIPTION OF THE FIGURES

FIG. 1 is a top plan view of a portion of a wire conveyor belt constructed in accordance with the present invention, with parts broken away to illustrate certain details of the construction;

FIG. 2 is a front elevation view to enlarged scale of the woven wire belting embodying the present invention, as viewed from the line 2–2 of FIG. 1;

FIG. 3 is a vertical section view thereof taken along the line 3–3 of FIG. 2, and FIG. 4 is a fragmentary perspective view of one of the reinforcing cross rods used in the conveyor belt.

DETAILED DESCRIPTION OF A PREFERRED EMBODIMENT

Referring to the drawing, wherein like reference characters designate corresponding parts throughout the several FIGS., there is illustrated an example of a rod reinforced type woven wire belt, indicated generally by the reference character 10, made up of a plurality of interlinked, plural loop, spiral segments 12. Each of the segments 12 spans the transverse width of the belt and comprise a selected number of flat spiral loops, indicated at 14, formed from a single wire defining flattened upper flight 16 and a flattened lower flight 18, and a pair of opposite recurved bights, termed for convenience the leading end bight 20 and the trailing end bight end 22. The leading end bights 20 of each segment 12 are interlinked with the trailing end bights 22 of the next adjacent segment, for example, as illustrated for the segments 12a and 12b in the drawing, but the confronting surfaces 20' and 22' of the interlinked bights are spaced from direct contact with each other by reinforcing cross rods 24 extending between these confronting surfaces in contact therewith and welded, as indicated at 26, at the opposite ends of the cross rods 24 to the outermost loop portions of the spiral segments.

The cross rods 24 are formed from the same type of wire from which the spiral segments 12 are made, which is customarily stored on large stock reels and has a slight amount of curved set imparted to the wire as a result of winding and storage of the wire on the reels. The wire drawn from the stock reel is straightened to produce the cross rods 24 by drawing the wire from the stock reel through crimping rolls preferably of the type having rounded tooth surfaces on the crimping rolls to provide substantially stress free crimped notches in the wire such as those heretofore employed to produce the sine wave pattern in connecter wires for balanced weave type belts. These crimping rolls produce small indentations or crimped recesses 28 in a pair of diametrically opposite surface portions of the wire, as is evident in the cross rod 24 illustrated in FIG. 4, the crimping recesses in one of the surface portions being staggered relative to the recesses in the diametrically opposite surface portion. By using such crimping rolls, with production of the attendant crimped recesses 28 in the wire, the wire drawn from the stock roll, despite its curved set, can be effectively straightened by the crimping process to provide appropriately rectilinear cross rods for the rod reinforced type belt. Prestraightened and cut rods can also be used for the cross rods 24, after passing them through such crimping rolls to form the crimped recesses 28 therein.

In order to attain improved resistance to V-ing or bowing of the center region of the respective segments out of transverse alignment with their corresponding lateral edge portions, the reinforcing cross rods 24 are oriented in such manner that the crimping recesses 28 formed therein face towards the upper and lower surfaces of the belt rather than facing in directions parallel to these surfaces. It has been found that with the cross rods formed, for example, from 10 gauge wire and crimped and oriented in this fashion, each cross rods rod has approximately 30 percent greater resistance to deformation in directions parallel to the upper and lower surfaces of the belt than would undeformed cylindrical cross rods of the same gauge and material. Obviously, the cross rods of the present invention oriented with their crimped indentations facing the upper and lower surfaces of the belt impart even greater resistance to V-ing of the belt than would cross rods of the type hereinabove mentioned wherein the longitudinally spaced notches provide seating recesses for the confronting bight portions of the interlinking loops and face in directions parallel to the planes of the upper and lower surfaces of the belt, as notches so oriented even further weaken the resistance of the cross rods to strain in directions parallel to the upper and lower belt surfaces.

Also, the spacing of the crimped recesses 28 in a direction longitudinally or axially of the wire 24 is so chosen in relation to the pitch of the spiral sections or the lateral spacing between the corresponding bight portions of each loop section 12, that portions of the loops 14 adjacent the juncture of each bight and upper flight 16 register with a crimped recess. During use of the belt, these crimped recesses, although they face the upper and lower surfaces of the belt, engage these loop portions and tend to restrain the loops against migrating from their proper alignment and transverse spacing and thus retard grouping of the loops more closely together near the lateral edges of the belt or other tendencies toward irregular or varying groupings transversely of the belt. It will be appreciated that especially in wire conveyor belts designed for high temperature uses, the center regions of the flights of the loops tend to sag inwardly somewhat, due to softening upon exposure to the high temperatures, causing a more pronounced engagement of the flights with the crimped notches 28 and enhanced restraining of the loops against shifting from proper alignment and spacing.

While the preferred embodiment herein described employs the novel cross rod construction as the reinforcing rods in a rod reinforced type woven wire belt, it will be understood that the novel cross rods with crimped recesses oriented in the specified manner can be employed with similar advantage in any type of woven wire belt using straight cross rods for either connecting or reinforcing functions. For example, such cross rods can be employed as the connecter rods in compound weave belts, close weave belts, double balanced belts, and similar well known types, wherein the cross rods serve as the connecters between successive segments with the bights of the loops of adjacent loop segments extending about the cross rods, but not interlinked through each other. In each of these applications, the crimped cross rods oriented as described for the illustrated example provide the improved resistance to V-ing and increased belt life.

I claim: 1. A wire conveyor belt comprising a plurality of spiral segments disposed in adjacent serial relation longitudinally of the belt and extending transversely of the belt along parallel transverse axes, said spiral segments each including a plurality of axially spaced loops having spaced upper and lower elongated flight portions respectively defining upper and lower surfaces of the belt and curved bight portions extending between said flight portions at the opposite ends of each loop, each adjacent pair of segments being intercoupled with each other at said bight portions to form hinged connections between successive segments, and a straight cross rod formed from cylindrical stock material extending through the bight portions of the loops of each adjacent pair of said segments, said cross rods being rigidly secured at their opposite ends to opposite end portions of said segments and having a plurality of inwardly impressed indentations at axially spaced positions along the length of said cross rods located only in the surface regions of the cross rods which face toward said flight portions of the loops through which they extend.

2. A wire conveyor belt as defined in claim 1, wherein said cross rods are crimped wire rods having a straight center axis and having a plurality of crimped recesses along the length thereof formed in each of diametrically opposite first and second surface portions of the rods defining said indentations.

3. A wire conveyor belt as defined in claim 2, wherein the crimped recesses define a pair of uniformly spaced series of recesses in the respective first and second surface portions with the recesses of one of the series arranged in alternating relation to the recesses of the other series, the recesses of each respective series being arranged along a rectilinear axis paralleling the center axis of the cross rod.

4. A wire conveyor belt as defined in claim 1, wherein the indentations define a pair of uniformly spaced series of recesses in the respective first and second surface portions with the recesses of one of the series arranged in alternating relation to the recesses of the other series, the recesses of each respective series being arranged along a rectilinear axis paralleling the center axis of the cross rod.

5. A wire conveyor belt as defined in claim 1, wherein the bight portions of said loops of each adjacent pair of said spiral segments are interlinked through each other and said cross rods are interposed between the respective interlinking bight portions spacing the latter from each other.

6. A wire conveyor belt as defined in claim 2, wherein the bight portions of said loops of each adjacent pair of said spiral segments are interlinked through each other and said cross rods are interposed between the respective interlinking bight portions spacing the latter from each other.

7. A wire conveyor belt as defined in claim 3, wherein the bight portions of said loops of each adjacent pair of said spiral segments are interlinked through each other and said cross rods are interposed between the respective interlinking bight portions spacing the latter from each other.

8. In a wire conveyor belt having a plurality of spiral segments disposed in adjacent serial relation longitudinally of the belt and transversely spanning the belt, each segment including plural axially spaced loops having spaced elongated flights substantially paralleling a selected belt plane and bights interconnecting the flights at opposite ends of the loops, each adjacent pair of segments being intercoupled with each other at said bights to form hinge connections; the improvement comprising straight reinforcing cross rods formed of cylindrical wire stock transversely spanning the belt and respectively extending through the bights of the adjacent segments, means rigidly securing the opposite ends of each cross rod to the opposite end portions of the segments, and said cross rods each having first and second series of inwardly impressed indentations arranged along rectilinear axes paralleling the center axis of the cross rod and located respectively in diametrically opposite surface portions of the rod facing perpendicular to said belt plane spaced out of engagement with said bights.

9. In a wire conveyor belt as defined in claim 8, said cross rods being crimped wire rods having crimped surface recesses defining said indentations, and the indentations of said first series being arranged in alternating relation to the indentations of said second series.